US006208917B1

(12) United States Patent
McKissick, Jr. et al.

(10) Patent No.: US 6,208,917 B1
(45) Date of Patent: Mar. 27, 2001

(54) AMBIENT TEMPERATURE/INLET AIR TEMPERATURE SENSOR DITHER

(75) Inventors: Garry W McKissick, Jr., Livonia; Chris J Booms, Milford; Thomas M Johnson, Berkley, all of MI (US)

(73) Assignee: DaimlerChrysler Corporation, Auburn Hills, MI (US)

( * ) Notice: Subject to any disclaimer, the term of this patent is extended or adjusted under 35 U.S.C. 154(b) by 0 days.

(21) Appl. No.: 09/471,585

(22) Filed: Dec. 23, 1999

(51) Int. Cl.[7] .................................................... G01M 15/00
(52) U.S. Cl. .............................................. 701/34; 340/449
(58) Field of Search ................................. 701/34, 29, 30; 340/457.4, 438, 449; 702/130

(56) References Cited

U.S. PATENT DOCUMENTS 4,398,258 8/1983 Naitoh et al. .
4,615,321 10/1986 Haefner et al. .
4,882,564 11/1989 Monroe et al. .
4,949,078 8/1990 Ito et al. .
5,107,246 4/1992 Mogaki .
5,153,835 10/1992 Hashimoto et al. .
5,235,527 * 8/1993 Ogawa et al. ....................... 702/116
5,243,854 9/1993 Ishida .
5,388,454 2/1995 Kuroda et al. .
5,554,969 9/1996 Eguchi .
5,614,664 * 3/1997 Yamagishi ........................... 73/118.1
5,617,337 4/1997 Eidler et al. .
5,815,828 9/1998 Nankee, II et al. .
5,848,381 12/1998 Ishii et al. .
5,880,361 3/1999 Taniguchi .
5,884,243 * 3/1999 Taniguchi et al. ................... 702/183
5,893,893 4/1999 Holt et al. .
5,948,026 9/1999 Beemer, II et al. .
5,995,887 * 11/1999 Hathaway et al. ..................... 701/34

* cited by examiner

*Primary Examiner*—Michael J. Zanelli
*Assistant Examiner*—Eric M. Gibson
(74) *Attorney, Agent, or Firm*—Roland A Fuller, III

(57) ABSTRACT

A computerized method diagnoses a vehicle temperature sensor. The method includes the steps of verifying a fault status for the sensor, and initializing a mileage based diagnostic when the default status indicates that no sensor faults are present. The mileage based diagnostic is conducted on the sensor upon initialization. The mileage based diagnostic is conducted by calculating a change in temperature and comparing the change in temperature to a predetermined temperature change. A change in mileage is also calculated and compared to a predetermined mileage change. The mileage based diagnostic further includes comparing a number of warmups for the vehicle to a predetermined number of warmups. The sensor is failed when the change in mileage reaches the predetermined mileage change, the number of warmups reaches the predetermined number of warmups, and the change in temperature does not reach the predetermined temperature change. Implementing a mileage based diagnostic allows stuck sensors to be detected with greater accuracy and improved customization on a vehicle-by-vehicle basis.

20 Claims, 6 Drawing Sheets

AMBIENT TEMPERATURE/INLET AIR TEMPERATURE SENSOR DITHER

BACKGROUND OF THE INVENTION

1. Field of the Invention

The present invention relates generally to automotive air temperature sensors. More particularly, the present invention relates to a method and system for diagnosing a vehicle temperature sensor.

2. Discussion of the Related Art

In the automotive industry, vehicles are typically designed to include many sensing components, modules, and systems. These sensing systems provide feedback regarding various conditions and parameters within the vehicle. Among the parameters being sensed are temperature, fluid level, and revolutions per minute (RPM). Temperature sensors typically report temperature information back to controllers within the vehicle to prevent overheating, as well as provide enhanced engine control. For example, temperature information regarding liquids such as engine coolant is desirable to prevent overheating. Similarly, information regarding air temperature at certain points in the vehicle allows engine control systems to be more accurate.

Air temperature sensors can be placed in various locations throughout the vehicle such as on the intake manifold for small vehicles, in the bumper of large vehicles for ambient temperature sensing, and over the vehicle bus. Air temperature sensors can also be modeled from other known parameters within the vehicle.

A common concern with automotive air temperature sensors relates to diagnosis of sensor rationality. For example, an intake sensor may be "stuck" such that the A/D converted signal remains unchanged regardless of the actual intake air temperature. Such a condition would be difficult to detect through the standard shorted high and shorted low electrical checks performed in the industry. It is therefore desirable to provide a diagnosis system which can detect stuck sensors. While attempts to diagnose stuck sensors have been made, certain problems still remain. One difficulty is that conventional approaches have determined a defective sensor to be one which does not change as expected over a given period of time. One shortcoming with this approach is that it fails to fully take into consideration operation of the vehicle. For example, a strictly time based sensor diagnostic system would be unable to distinguish between a vehicle which has been merely started and a vehicle which has actually been driven. Thus, the potential for incorrect fault determinations is relatively high for time based sensor diagnostic systems. It is therefore desirable to provide a non-time based system and method for identifying faulty temperature sensors without relying on expiration of time.

SUMMARY OF THE INVENTION

The present invention provides a computerized method for diagnosing a vehicle temperature sensor. The method includes the steps of verifying a fault status for the sensor, and initializing a mileage based diagnostic when the fault status indicates that no sensor faults are present. The mileage based diagnostic is conducted on the sensor upon initialization. Implementing a mileage based diagnostic allows stuck sensors to be detected with greater accuracy and improved customization on a vehicle by vehicle basis.

The present invention also provides a computerized method for conducting a mileage based diagnostic on a vehicle temperature sensor. The method includes the steps of calculating a change in temperature for the sensor, and comparing the change in temperature to a predetermined temperature change. A change in mileage for the vehicle is calculated and compared to a predetermined mileage change. The method further provides for comparing a number of warm-ups for the vehicle to a predetermined number of warm-ups. Thus, the sensor can be failed when the change in mileage reaches the predetermined mileage change, the number of warm-ups reaches the predetermined number of warm-ups, and the change in temperature does not reach the predetermined temperature change. Referencing operation of the sensor to a calibratable mileage and a calibratable number of warm-ups allows customization unachievable by conventional methods.

The present invention further provides for a vehicle temperature sensor diagnostic system. A fault status verification module verifies a fault status for the sensor. An initialization module then initializes the mileage based diagnostic when the fault status indicates that no sensor faults are present. Thus, a diagnostic module is able to conduct the mileage based diagnostic upon initialization such that stuck sensors can be identified.

Further objects, features and advantages of the invention will become apparent from a consideration of the following description and the appended claims when taken in connection with the accompanying drawings.

BRIEF DESCRIPTION OF THE DRAWINGS

The present invention will become more fully understood from the detailed description and the accompanying drawings, wherein.

DETAILED DESCRIPTION OF THE PREFERRED EMBODIMENT

Figure 1:
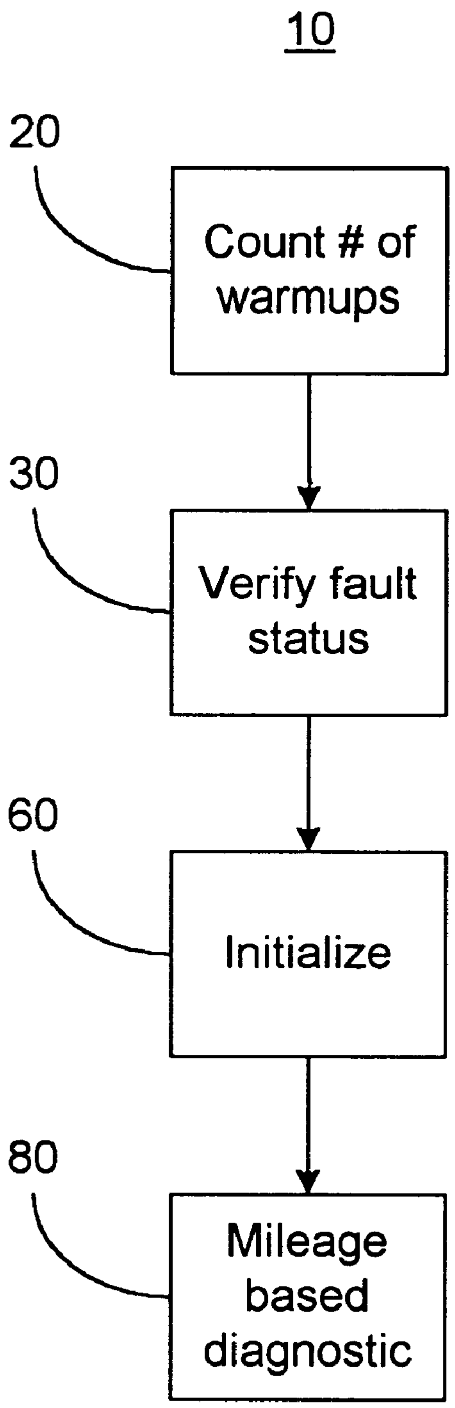
FIG. 1 is a flowchart of a computerized method for diagnosing a vehicle temperature sensor in accordance with the present invention.

FIG. 1 is a flowchart of a computerized method 10 for diagnosing a vehicle temperature sensor in accordance with a preferred embodiment of the present invention. It will be appreciated that the method 10 can be implemented either in a dedicated controller or in the engine controller as part of the on board diagnostic (OBD). Generally, method 10 includes the step 30 of verifying a fault status for the sensor, and step 60 of initializing a mileage based diagnostic when the fault status indicates that no sensor faults are present. The mileage based diagnostic is conducted on the sensor at step 80 upon initialization. Preferably, the method 10 further includes the step 20 of counting a number of warm-ups for the vehicle. Counting warm-ups provides additional assurance that a lack in temperature change for the sensor is truly related to a stuck sensor. Thus, the preferred embodiment will require a minimum number of warm-ups before allowing a fault determination.

Figure 2:
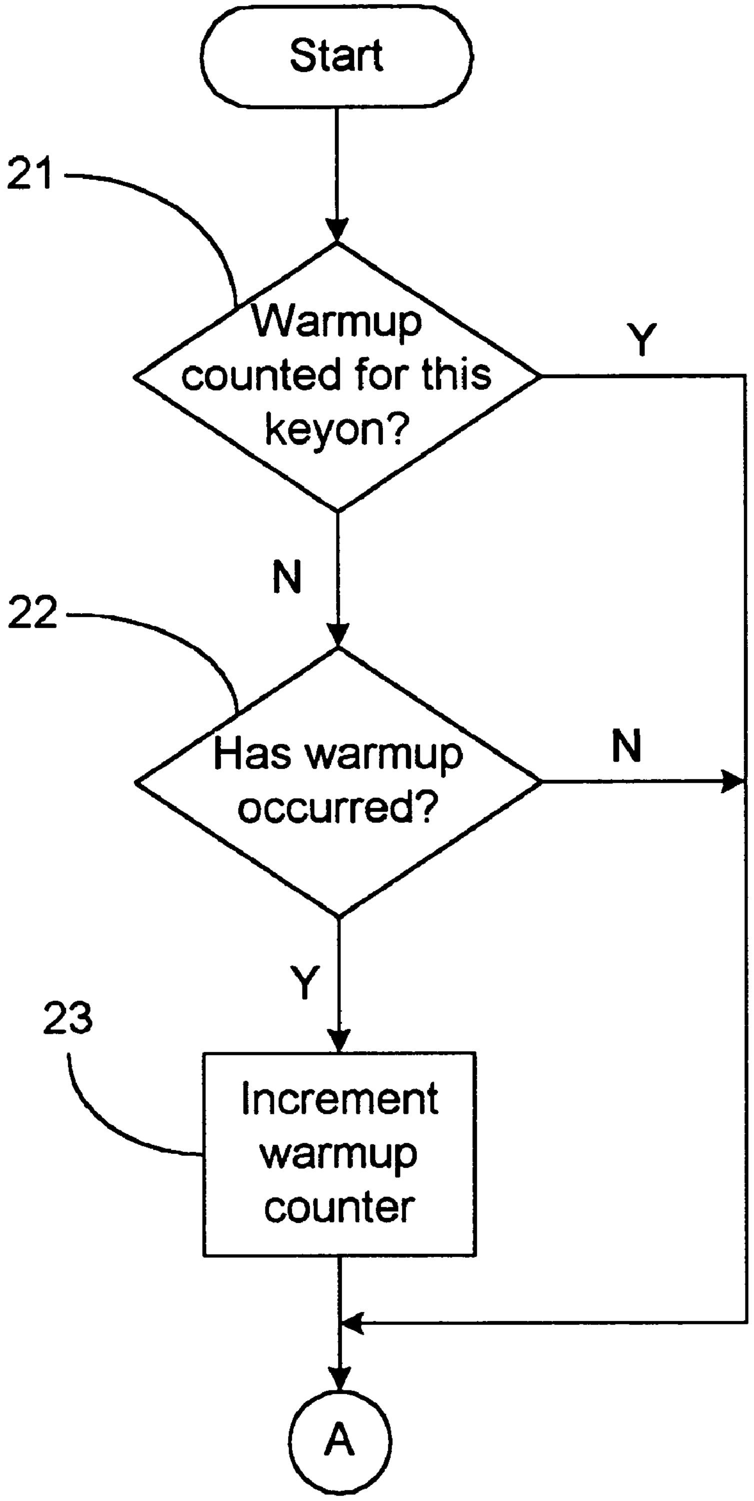
FIG. 2 is a flowchart of a process for counting a number of warm-ups for a vehicle.

Turning now to FIG. 2, a preferred subroutine for counting warm-ups is shown. At step 21, it is determined whether a warm-up has been counted for this "key on". It will be appreciated that a maximum of one warm-up will be counted for each time the ignition is placed in the "key on" mode. If the engine does not sufficiently warm-up, however, no warm-up will be counted. Thus, if it is determined that a warm-up has been counted for this "key on" at step 21, the subroutine will immediately move to connection point A. If not, a determination of whether a warm-up has occurred will take place at step 22. The standard approach to defining a warm-up is verifying a change in coolant temperature for the vehicle, and verifying a minimum temperature reported by the sensor. The current industry standard is a 40° variation from initial coolant temperature and a minimum temperature of +170° F. If a warm-up has occurred, the warm-up counter is incremented at step 23.

Figure 3:
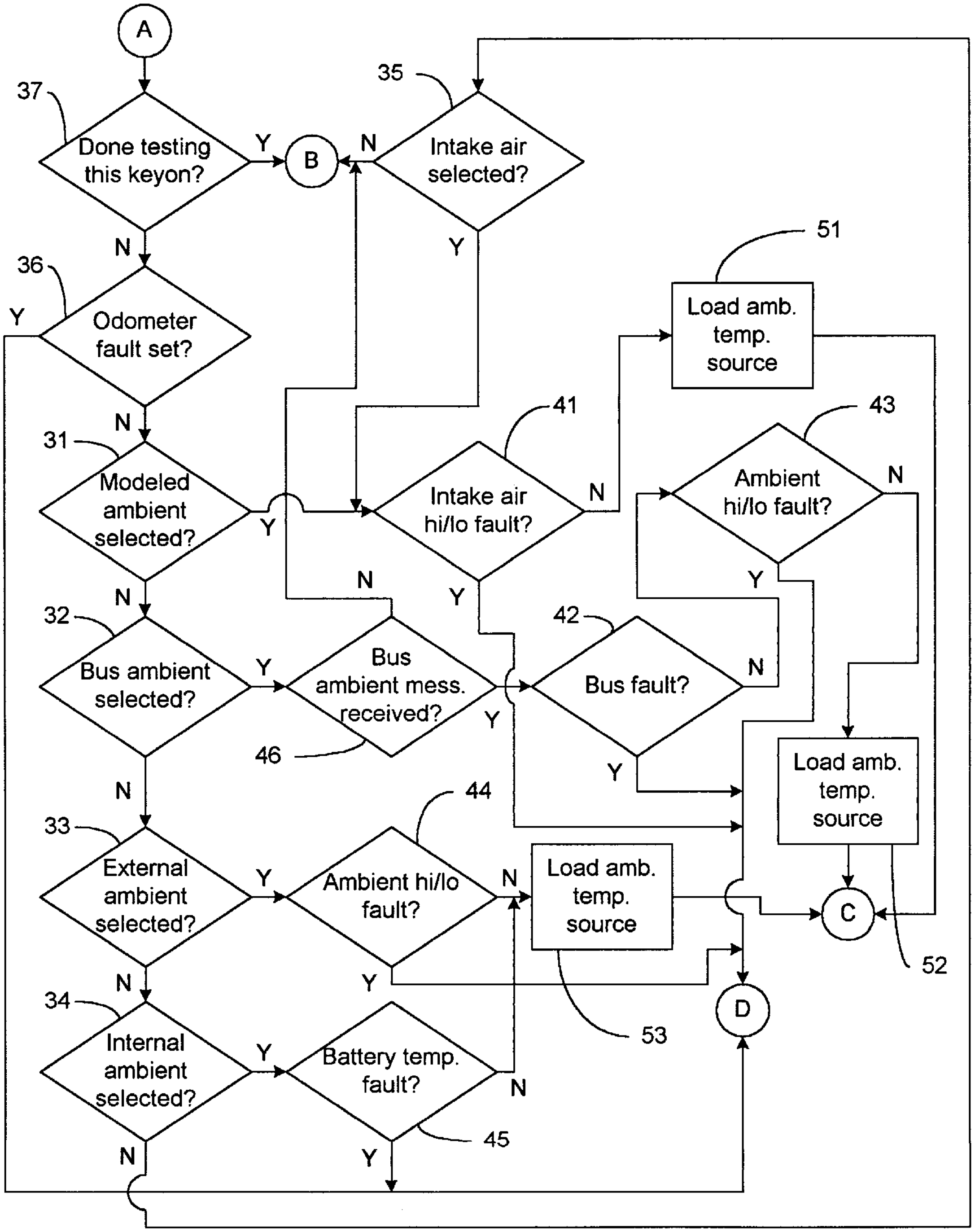
FIG. 3 is a flowchart of a process for verifying a fault status for a sensor.

FIG. 3 demonstrates a preferred approach to verifying a fault status for the sensor. It can be seen that steps 31, 32, 33, 34, and 35 identify the sensor under test. Thus, the sensor can be a modeled sensor (step 31), an overbus sensor (step 32), an external ambient sensor (step 33), an internal ambient sensor (step 34), or an intake air sensor (step 35). Once the sensor has been identified, fault determinations are made at steps 41, 42, 43, 44, and 45. If it is determined that no faults have been reported, then at steps 51, 52, and 53, the ambient temperature source is loaded into the desired RAM location. It will be appreciated that an odometer fault check is provided for at step 36. It will further be appreciated that a check for a bus ambient message is provided at step 46 before checking for a bus fault at step 42. If testing has been completed for this "key on", either because a pass or a failure has been reported, step 37 will detect such a condition.

Figure 4:
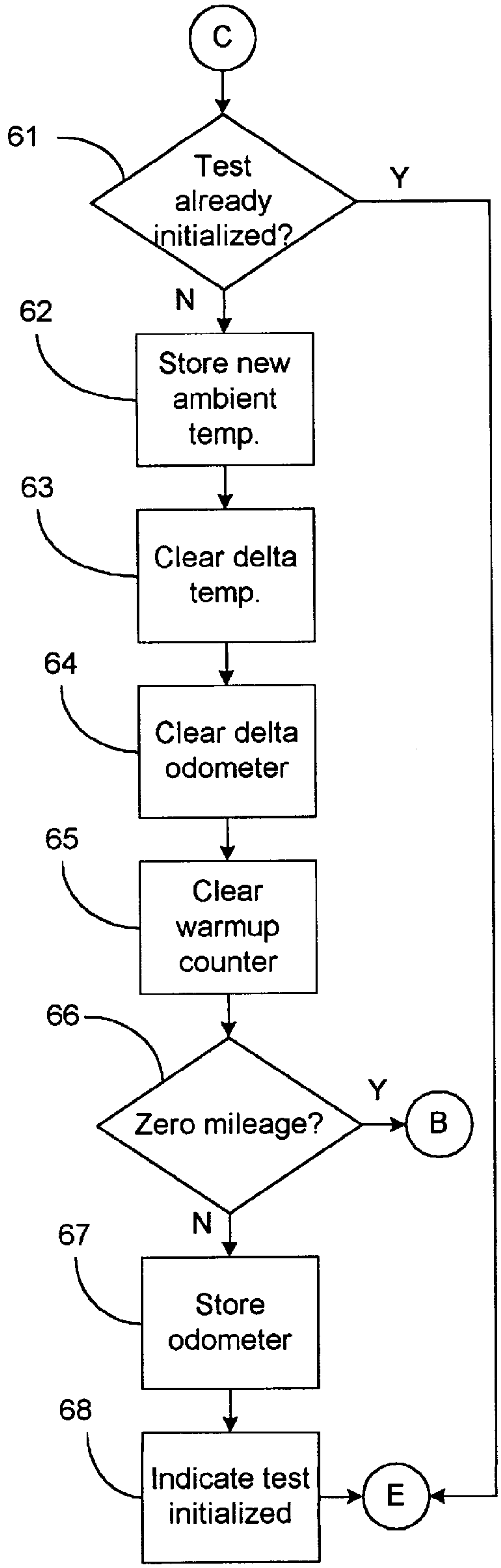
FIG. 4 is a flowchart of a process for initializing a mileage based diagnostic.

Turning now to FIG. 4, a preferred approach to initializing a mileage based diagnostic when the fault status indicates that no sensor faults have been reported is shown. It will be appreciated that initialization generally involves obtaining a measurement temperature and obtaining a measurement mileage. It will further be appreciated that at step 61, it is determined whether the diagnostic test is already initialized. If not, a new ambient measurement temperature is stored at step 62, and the delta temperature is cleared at step 63. At step 64, the delta odometer is cleared, and at step 65 the warm-up counter is cleared. A check for zero mileage is performed at step 66. If the mileage is not zero, the odometer value is stored in the appropriate RAM location at step 67. If the mileage is zero, the subroutine proceeds to connector point B. At step 68, it is indicated that the test is initialized. Initialization means that a valid ambient measurement temperature and odometer reading have been obtained and that the mileage based diagnostic can be conducted.

Figure 5:
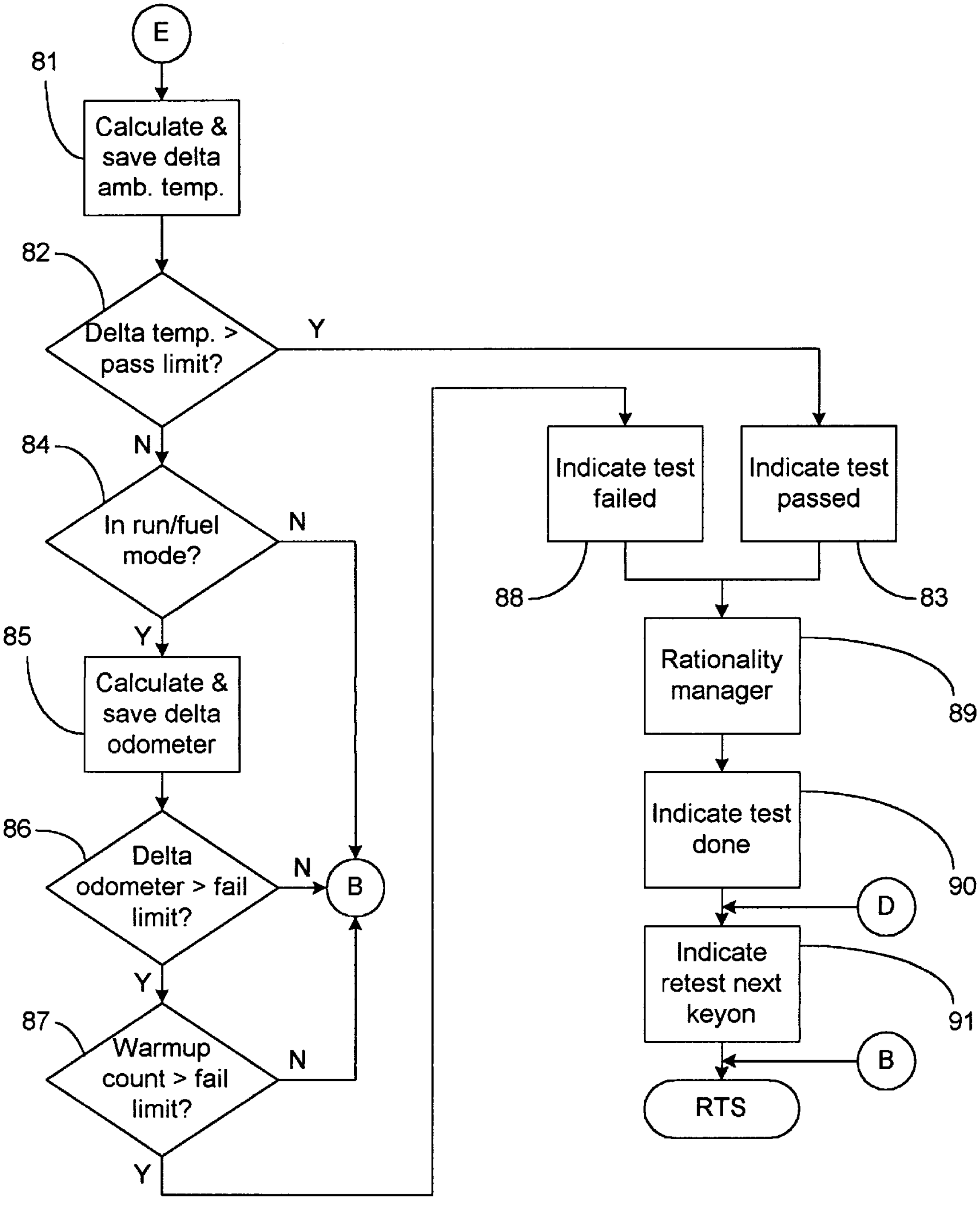
FIG. 5 is a flowchart of a process for conducting a mileage based diagnostic.

Turning now to FIG. 5, a preferred approach to conducting the mileage based diagnostic is shown. Generally, a change in temperature is calculated for the sensor at step 81, and the change in temperature is compared to a predetermined temperature change at step 82. When the change in temperature reaches the predetermined temperature change, the sensor is passed at step 83. It will further be appreciated that a check is performed to determine whether the vehicle is in the run/fuel mode at step 84. If the vehicle is in the run/fuel mode, a change in mileage is calculated for the vehicle at step 85, and compared to a predetermined mileage change at step 86. When the change in mileage reaches the predetermined mileage change, the number of warm-ups for the vehicle is compared to a predetermined number of warm-ups at step 87. If the number of warm-ups reaches the predetermined number of warm-ups, the sensor is failed at step 88. It will be appreciated that the predetermined temperature change, the predetermined mileage change, and the predetermined number of warm-ups are all calibratable. The pass/fail information is passed to a rationality manager for use throughout the vehicle at step 89. At step 90, it is indicated that the test is done, and at step 91, it is indicated that a retest on the next "key on" is desired.

Figure 6:
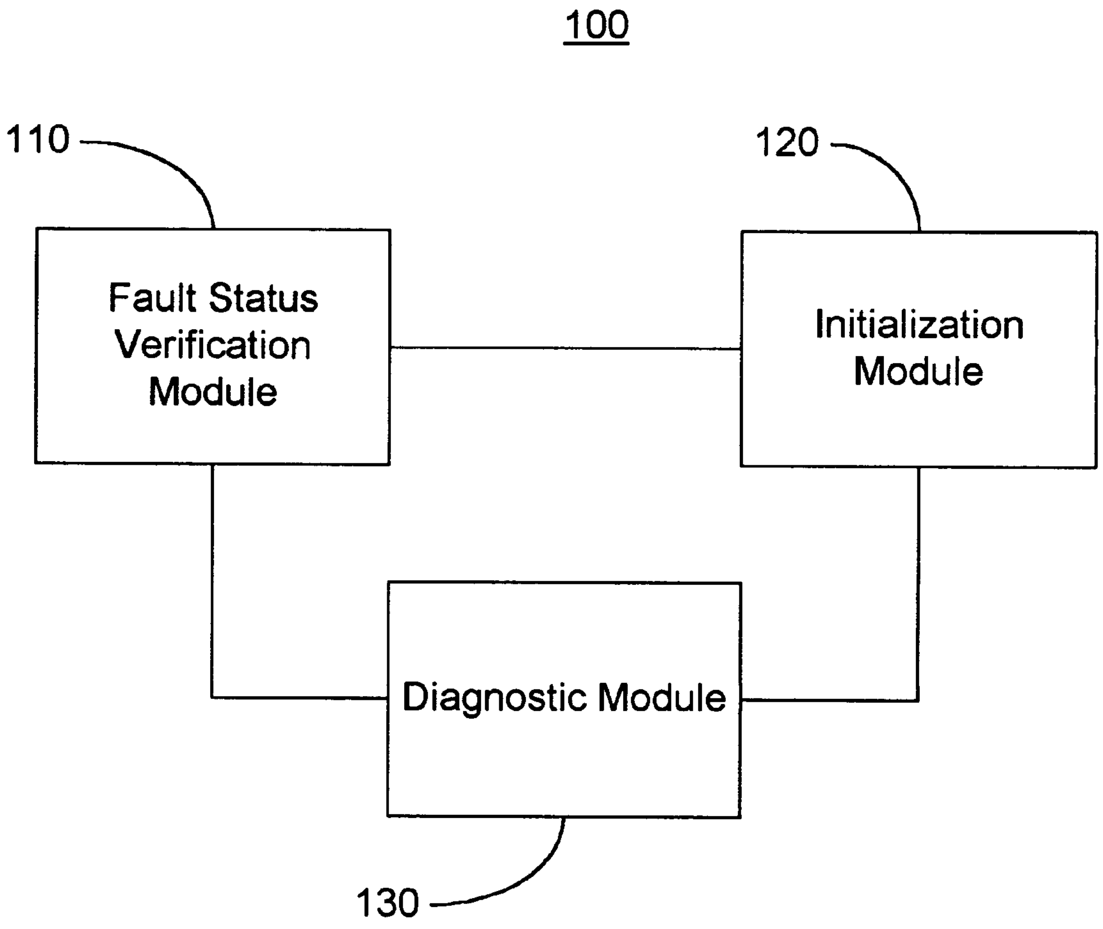
FIG. 6 is a block diagram of a vehicle temperature sensor diagnostic system in accordance with the present invention.

FIG. 6 demonstrates a vehicle temperature sensor diagnostic system 100 according to the present invention. Diagnostic system 100 includes a fault status verification module 110 for verifying a fault status for the sensor (not shown). An initialization module 120 initializes a mileage based diagnostic when the fault status indicates that no sensor faults are present. The diagnostic system 100 further includes a diagnostic module 130 for conducting the mileage based diagnostic upon initialization. Preferably, the diagnostic system 100 is implemented in an engine controller for the vehicle as part of the on board diagnostics. Diagnostic system 100 may also be implemented, however, in a dedicated controller.

It is to be understood that the invention is not limited to the exact construction illustrated and described above, but that various changes and modifications may be made without departing from the spirit and scope of the invention as defined in the following claims.

What is claimed is:

1. A computerized method for diagnosing a vehicle temperature sensor, the method comprising the steps of:
   - verifying a fault status for the sensor;
   - initializing a mileage based diagnostic when the fault status indicates that no sensor faults are present; and
   - conducting the mileage based diagnostic on the sensor upon initialization.

2. The method of claim 1 further including the step of counting a number of warm-ups for the vehicle.

3. The method of claim 2 further including the step of verifying a change in coolant temperature for the vehicle.

4. The method of claim 2 further including the step of verifying a minimum temperature reported by the sensor.

5. The method of claim 1 further including the step of identifying the sensor.

6. The method of claim 5 wherein the sensor is a modeled sensor.

7. The method of claim 5 wherein the sensor is an over bus sensor.

8. The method of claim 5 wherein the sensor is an intake sensor.

9. The method of claim 5 wherein the sensor is an ambient temperature sensor.

10. The method of claim 1 further including the steps of:
    - obtaining a reference temperature; and
    - obtaining a reference mileage.

11. The method of claim 1 further including the steps of:
    - calculating a change in temperature for the sensor;
    - comparing the change in temperature to a predetermined temperature change; and
    - passing the sensor when the change in temperature reaches the predetermined temperature change.

12. The method of claim 11 further including the steps of:
    - calculating a change in mileage for the vehicle; and
    - comparing the change in mileage to a predetermined mileage change.

13. The method of claim 12 further including the steps of:
    - comparing a number of warm-ups for the vehicle to a predetermined number of warm-ups; and
    - failing the sensor when the change in mileage reaches the predetermined mileage change, the number of warmups reaches the predetermined number of warm-ups, and the change in temperature does not reach the predetermined temperature change.

14. The method of claim 13 wherein the predetermined temperature change, the predetermined mileage change, and the predetermined number of warm-ups are calibratable.

15. A computerized method for conducting a mileage based diagnostic on a vehicle temperature sensor, the method comprising the steps of:

calculating a change in temperature for the sensor;

comparing the change in temperature to a predetermined temperature change;

calculating a change in mileage for the vehicle;

comparing the change in mileage to a predetermined mileage change;

comparing a number of warm-ups for the vehicle to a predetermined number of warm-ups; and failing the sensor when the change in mileage reaches the predetermined mileage change, the number of warm-ups reaches the predetermined number of warm-ups, and the change in temperature does not reach the predetermined temperature change.

16. The method of claim 15 further including the step of passing the sensor when the change in temperature reaches the predetermined temperature change.

17. The method of claim 15 wherein the predetermined temperature change, the predetermined mileage change, and the predetermined number of warm-ups are calibratable.

18. A vehicle temperature sensor diagnostic system comprising:

a fault status verification module for verifying a fault status for the sensor;

an initialization module for initializing a mileage based diagnostic when the fault status indicates that no sensor faults are present; and a diagnostic module for conducting the mileage based diagnostic upon initialization.

19. The diagnostic system of claim 18 wherein the diagnostic system is implemented in an engine controller for the vehicle.

20. The diagnostic system of claim 18 wherein the diagnostic system is implemented in a dedicated controller.

* * * * *